Patented May 21, 1935

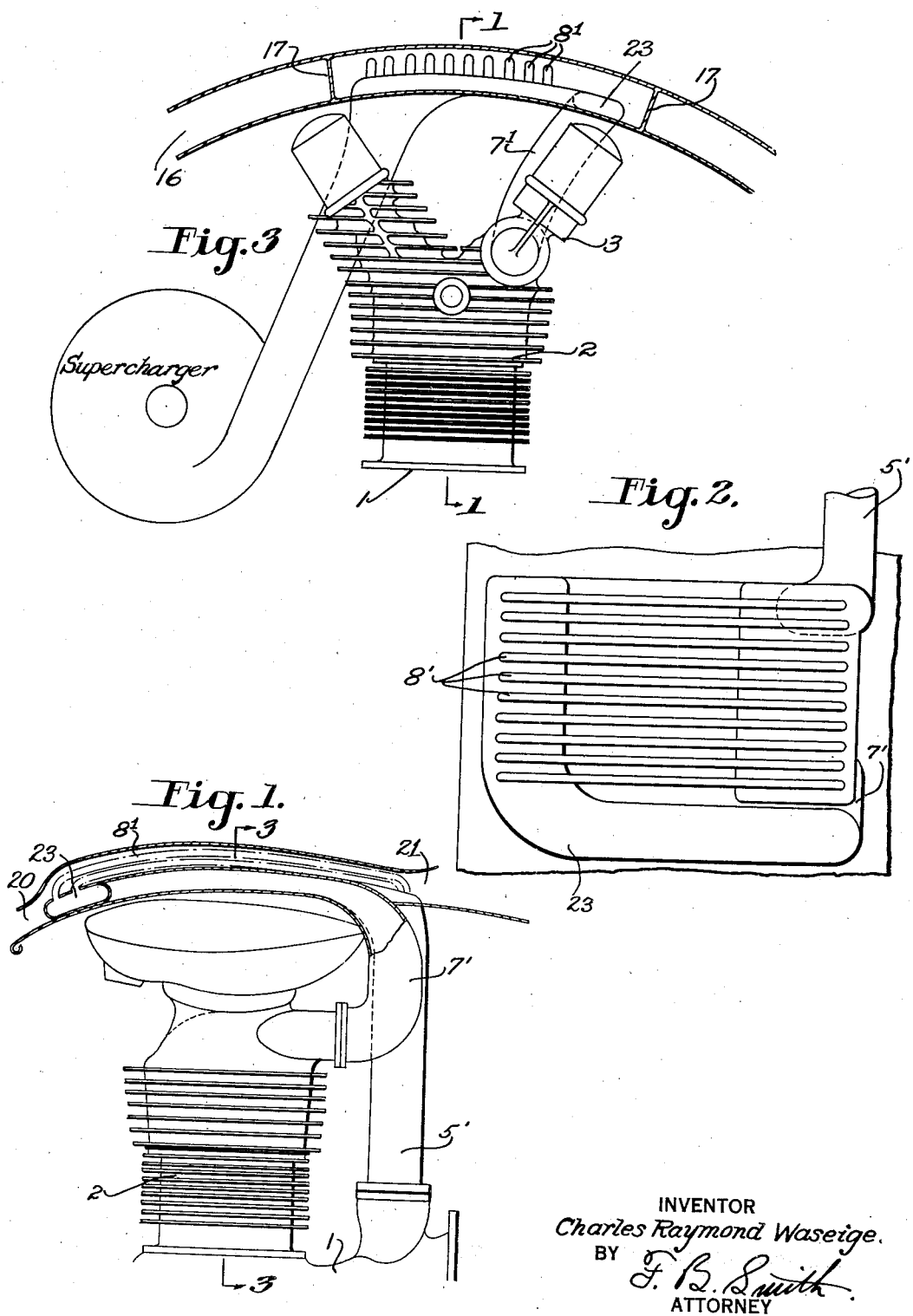

2,002,049

UNITED STATES PATENT OFFICE 2,002,049

INTERNAL COMBUSTION ENGINE

Charles Raymond Waseige, Rueil, France, assignor to Eclipse Aviation Corporation, East Orange, N. J., a corporation of New Jersey Application February 6, 1931, Serial No. 513,971

9 Claims. (Cl. 123—55)

This invention relates to internal combustion engines, and particularly to means for maintaining a supply of suitable combustible or combustion supporting fluid, for engines of this character.

An object of the invention is to provide in conjunction with an engine of the foregoing character having a supercharger or compressor associated therewith, novel means for maintaining the proper temperature of such fluid in the passage or passages connecting such supercharger or compressor with the combustion chambers of the associated engine.

Another object of the invention is to provide novel temperature regulating means which shall be particularly effective in regulating the temperature of the combustion charge passing into the cylinders of an engine of the air cooled type, although the invention is not confined in its use or utility to engines of this type.

A further object is to provide novel cooling means which may be interposed between the supercharger and the cylinders of the engine, and also in certain instances between different cylinders, so as to obtain the benefit of the cooling action of the air stream passing between such surfaces.

A further object of the invention is to provide means of the foregoing character so positioned as to be most effective in cooling the combustion controlling charge passing from the supercharger to the engine cylinders without at the same time interfering with the maintenance of proper temperature in the cylinders themselves.

A further object of the invention is to provide novel cooling means of the foregoing character so constructed as to produce an accelerating effect upon the air stream through which the engine is moving, thereby increasing the cooling action.

A further object of the invention is to provide cooling means of the foregoing character so constructed and disposed with respect to the engine as to obtain the maximum benefit from the cooling action of the air through which the engine is moving.

Other objects of the invention include the provision of a cooling sytem of the foregoing character which shall be inexpensive to manufacture, install, and maintain, effective in its operation, and capable of functioning as intended without in any way handicapping or interfering with the efficient operation of the engine or of the craft propelled by the engine.

Other objects and advantages to be derived from the use of this invention reside in the construction, arrangement, and method of operation of the parts, and will become apparent upon inspection of the following description with reference to the accompanying drawing. It is to be expressly understood, however, that the drawing is for the purpose of illustration and description only, and is not designed as a definition of the limits of the invention, reference being had for this purpose to the appended claims.

In the drawing, wherein similar reference characters refer to like parts throughout the several views Fig. 1 is an elevation view partly in section to a device constituting another embodiment of the invention.

Fig. 2 is a top plan view of the device shown in Fig. 1.

Fig. 3 is an elevation view taken along the line 3—3 of Fig. 1.

The invention is shown in connection with a radial engine having a cylinder 3 with cooling fins 2 and of the type employing a streamlined outer cowl or envelope such as indicated at 16 in Fig. 3. Theoretically, this cowl or envelope should be annular in form with an external profile different from the internal profile. In order to adapt this envelope to the purposes of the present invention, the envelope is open at its front end as indicated at 20 and also at the rear, as indicated at 21 so that the air flow through the collectors or manifolds 5' and 7' leading from the supercharger (not shown) to the combustion chambers may be subject to the cooling action of the air stream through which the engine is moving. The forward and rear openings in the cowl or envelope are preferably flared in order to increase the velocity of the air flowing therethrough. To accomplish the maximum advantage of the cooling action, a set of tubes 8' are preferably provided to connect the member 23 into the collector 5' constituting the entrance portion of the collector 7', it being understood that these elements could be made of suitable form to be enclosed within the envelope. If it is desired to maintain separate flow through the different cylinders, partitions 17 may be provided as indicated in Fig. 3.

From the foregoing, it will be apparent that the invention provides means for removing objectionable heat generated in the combustible charge by the compressing action in the supercharger and that a proper working temperature is maintained, thereby rendering it unnecessary to depend to such a large extent upon the cooling action of the air which is in direct contact with the cylinder walls. The invention in this connection is of particular advantage in that it makes it possible to eliminate water cooling in engines which have heretofore resorted to the use of liquid cooling in order to remove the additional heat resulting from the compression of the combustion supporting charge.

While there has been described a preferred embodiment of the invention, it is to be understood that changes may be made therein within the scope of the present disclosure.

What is claimed is:

1. In an internal combustion engine of the radial type employing a supercharger for compressing the combustion supporting fluid and having a surrounding cowl for directing air toward the engine, the combination with said supercharger of a plurality of generally radially extending intake conduits leading from said supercharger to the combustion chambers of said engine, said cowl including an air conduit surrounding said first named conduits and open at one end for the entrance of atmospheric air and at the other end for the discharge thereof, and means associated with said last named conduit for increasing the velocity of the atmospheric air flowing through said conduit.

2. In an internal combustion engine of the type having a plurality of radially disposed cylinders, in combination with a supercharger driven by said engine, a plurality of intake conduits leading from said supercharger to said combustion chambers of said cylinders and an annular envelope surrounding said engine and said conduits having openings at its forward and rearward portions for the entrance and discharge and circulation of atmospheric air around and between said intake conduits, at least one of said openings being flared for increasing the air velocity through the opening.

3. In combination with a multicylinder radial internal combustion engine for an airplane, a supercharger therefor, a plurality of supply conduits leading generally radially from the supercharger to the cylinders, means in each conduit including a plurality of tubes for subdividing the flow therethrough, and an air deflector encircling the engine including spaced walls enclosing the tubes adapted to collect and direct atmospheric air around said tubes during flight of the airplane, said deflector comprising a conduit having an intake opening in the line of flight and a discharge opening rearward of intake opening.

4. In combination with a radial engine, a hollow cowl member surrounding the engine and spaced therefrom for collecting and directing an air flow past the engine cylinders, and an intake conduit for the engine having a portion thereof arranged internally of the cowl.

5. In combination with a radial engine, a hollow cowl member surrounding the engine and spaced therefrom for collecting and directing an air flow past the engine cylinders, an intake conduit for the engine having a portion thereof arranged internally of the cowl, and said portion including a plurality of tubes for subdividing the flow through the intake conduit.

6. In combination with a radial airplane engine, an air deflecting cowl surrounding the engine for directing cooling air toward the engine, said cowl comprising a pair of substantially circular members defining an annular space around the engine, and an intake conduit for the engine having a portion of its length within the annular space and in position to be swept by the air current passing through the space.

7. In combination with a radial airplane engine, an air deflecting cowl surrounding the engine for cooling the same, said cowl comprising a pair of substantially circular members defining an annular space around the engine, an intake conduit for the engine having a portion of its length within the annular space and in position to be swept by the air current passing through the space, and said cowl having an annular intake opening in the line of flight and a discharge opening rearward of the intake opening, at least one of said openings being flared to increase the air velocity therethrough.

8. In combination with a multicylinder radial engine, a cowl member encircling the engine for cooling the same and spaced therefrom for collecting and directing an airflow past the engine cylinders, said cowl including radially spaced walls, an intake conduit for each cylinder having a portion thereof arranged between said walls, said cowl having flared intake and discharge openings therein arranged adjacent each intake conduit portion, said intake conduit portion that is arranged between the walls including a plurality of individual tubes for subdividing the flow, and means between the spaced walls for directing airflow through the cowl in a direction substantially axially of the cowl.

9. In combination with a multicylinder radial engine, a cowl member encircling the engine for cooling the same and spaced therefrom for collecting and directing an airflow past the engine cylinders, said cowl including radially spaced walls, an intake conduit for each cylinder having a portion thereof arranged between said walls, said cowl having flared intake and discharge openings therein arranged adjacent each intake conduit portion, and partitions bridging the space between the walls arranged to direct the airflow from each intake opening past the intake conduit portion to the corresponding discharge opening.

CHARLES RAYMOND WASEIGE.